United States Patent Office 2,877,045
Patented Mar. 10, 1959

2,877,045

NIPPER AND GAFF GRIP COMBINATION

Roy F. Payne, Ucluelet, British Columbia, Canada

Application April 26, 1957, Serial No. 655,401

2 Claims. (Cl. 294—26)

My invention relates to new and useful improvements in nipper and gaff grip combination, the principal object and essence of my invention being to provide a line nipper adapted to encircle the conventional gaff handle and to be manipulated by the hand grasping the gaff handle around the nipper whereby manual pressure can be applied to frictionally engage the fishing line passing therethrough.

In the art of fishing, particularly salmon fishing, it is conventional to troll for the fish with a line without the use of a rod and reel. When the fish engages the line, the fish is played by manipulating the line until same is close enough to be engaged by a conventional gaff. However, due to the weight and liveliness of this type of fish, it often runs just at the moment that the gaff is about to be engaged. This causes the line to run through the fingers of the fisherman causing severe burns and often causing him to drop the gaff with subsequent loss thereof.

A wide strip of rubber has been used which fits around the hand in order to grasp the line without burning under these conditions, but it is necessary to discard this band of rubber in order to pick up the gaff and engage the fish by the gills.

I have overcome the disadvantages of this awkward maneuver by making a combination line nipper and gaff which can be manipulated with one hand, leaving the other hand free to play the fish with the line.

Although the drawings illustrate the line nipper as being engaged around the gaff handle, it will be appreciated that, if desired, it can be engaged around a relatively short length thus making it an individual line nipper, but it is preferable to combine same with the gaff to ensure that the gaff is used when landing the fish as it will be appreciated that it is more efficient to gaff a fish than to endeavor to lift a fish such as a salmon, into the boat by the line itself.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
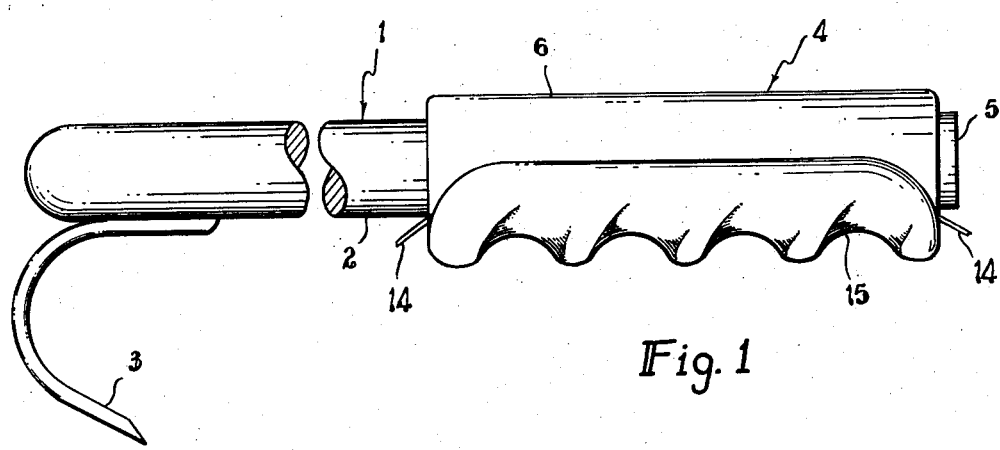
Figure 1 is a side elevation of a conventional gaff showing my device.
Figure 2:
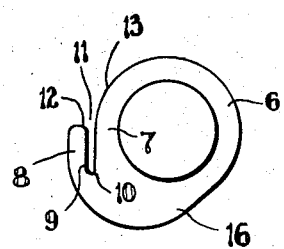
Figure 2 is an end elevation of Figure 1.

Proceeding therefore to describe my invention in detail, it will be seen upon reference to the accompanying drawings that I have illustrated a conventional gaff collectively designated 1 consisting of an elongated cylindrical handle 2 having a conventional gaff hook 3 secured to one end thereof.

My device collectively designated 4 is engaged around the other end 5 of the gaff handle 2 and consists of an open cylindrical portion 6 made preferably of resilient material such as rubber or plastic and having a diameter slightly less than the diameter of the handle so that same is expanded when placed on the handle and engages same frictionally without movement.

Adjacent one side 7 of the cylindrical portion 6, is formed an offstanding flange 8 of the same resilient material, said flange extending upwardly substantially parallel to the side 7 thus defining an open line engaging slot 9 extending from a point 10 to the open side 11.

The upper edge 12 of the flange 8 is flared outwardly corresponding with the flared curvature 13 of the main portion 6 and these two flared portions facilitate entry within the slot of the fishing line 14 which, when engaged within the slot, rest at the base 10 of the slot.

Moulded finger engaging grips 15 are formed on the under side portion 16 of the nipper grip 4 to facilitate operation.

In use, the device is preferably engaged over the end 5 of the gaff hook and when the fish has been played to a position where it is approaching the boat, the line 14 is engaged within the slot 9 of the grip. The other hand continues to draw the fish towards the boat, any movement of the fish away from the boat being checked by a squeezing of the hand surrounding the grip which closes the flange 8 against the side 7 and grips the line firmly within the slot 9. In this way the gaff hook 3 may engage the fish at the opportune moment and same may be landed.

If it is desired to use the line nipper separately from the gaff hook, then the device 4 may be engaged over a relatively short length of wood or similar material (not illustrated), or alternatively, it may be made solid. The operation of line nipper per se is, of course, similar to that hereinbefore described and is a considerable improvement over the conventional flat band of rubber which is normally used.

Inasmuch as the moulded finger engaging grips 15 are formed horizontally across the underside portion 16, it will be appreciated that the grip can be reversed end to end on the gaff handle thus making it usable with equal facility by either the right or left hand of the operator.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A nipper and gaff grip for fishing, comprising in combination with an elongated gaff handle, and a gaff hook on one end thereof; a line nipper on the other end thereof, said line nipper including resilient slot means adapted to surround the associated fishing line and selectively apply frictional pressure thereto, said line nipper being formed of resilient material adapted to surround said gaff handle, an offstanding flange formed integrally with said nipper, and lying parallel to one side thereof, said flange and said side defining an elongated open line engaging slot, and finger engaging grips formed on the underside of said nipper.

2. The device according to claim 1 which includes a flared entrance for said slot at the upper edges thereof.

References Cited in the file of this patent

UNITED STATES PATENTS

| | | |
|---|---|---|
| 263,775 | Emmert | Sept. 5, 1882 |
| 295,112 | Chesnut | Mar. 11, 1884 |
| 675,788 | Oakley | June 4, 1901 |
| 678,246 | Hansel | July 9, 1901 |
| 2,124,615 | Foltz | July 26, 1938 |
| 2,592,856 | Brockman | Apr. 15, 1952 |
| 2,677,911 | Fink | May 11, 1954 |
| 2,723,152 | Doty | Nov. 8, 1955 |